(12) United States Patent
Kang et al.

(10) Patent No.: US 7,090,376 B2
(45) Date of Patent: Aug. 15, 2006

(54) POWER SUPPLY MODULE FOR LAMP TUBE ASSEMBLY

(75) Inventors: Moon-Shik Kang, Seongnam-si (KR); Hyeong-Suk Yoo, Seongnam-si (KR)

(73) Assignee: Samsung Electronics Co., Ltd., (KR)

( * ) Notice: Subject to any disclaimer, the term of this patent is extended or adjusted under 35 U.S.C. 154(b) by 41 days.

(21) Appl. No.: 10/454,343

(22) Filed: Jun. 3, 2003

(65) Prior Publication Data

US 2004/0047148 A1    Mar. 11, 2004

(30) Foreign Application Priority Data

Sep. 11, 2002    (KR)    ............... 10-2002-0054793

(51) Int. Cl.
H01R 33/02    (2006.01)

(52) U.S. Cl. .............. 362/225; 362/226; 362/652; 362/658; 439/235; 439/384

(58) Field of Classification Search ........ 362/225, 362/226, 369, 390, 3, 11, 217, 227, 249, 362, 362/382, 396, 652, 658; 439/235, 384, 36, 439/56, 226, 232, 239, 242, 382

See application file for complete search history.

(56) References Cited

U.S. PATENT DOCUMENTS

| | | | | |
|---|---|---|---|---|
| 1,293,594 A | * | 2/1919 | Willey ............. | 362/241 |
| 1,403,048 A | * | 1/1922 | Mecorney ............. | 340/525 |
| 1,717,762 A | * | 6/1929 | Howlett ............. | 439/384 |
| 1,851,673 A | * | 3/1932 | Kilgour ............. | 439/384 |
| 2,560,212 A | * | 7/1951 | Byrd et al. ............. | 439/384 |
| 2,707,774 A | * | 5/1955 | Bernhard ............. | 439/723 |
| 2,909,756 A | * | 10/1959 | Sitz ............. | 439/721 |
| 2,923,913 A | * | 2/1960 | Kulka ............. | 439/491 |
| 3,215,973 A | * | 11/1965 | Falconer ............. | 439/711 |
| 3,333,228 A | * | 7/1967 | Hans ............. | 439/239 |
| 3,412,276 A | * | 11/1968 | Curl ............. | 439/239 |
| 3,953,100 A | * | 4/1976 | Feeney ............. | 439/235 |
| 4,184,194 A | * | 1/1980 | Shofu ............. | 362/97 |
| 4,195,194 A | * | 3/1980 | Kuster et al. ............. | 439/391 |
| 4,210,379 A | * | 7/1980 | Vachhani et al. ............. | 439/406 |
| 4,236,778 A | * | 12/1980 | Hughes et al. ............. | 439/406 |
| 4,273,408 A | * | 6/1981 | Orr ............. | 439/737 |
| 4,282,566 A | * | 8/1981 | Newman ............. | 362/369 |
| 4,312,028 A | * | 1/1982 | Hamacher ............. | 362/369 |
| 4,708,715 A | * | 11/1987 | Troutner et al. ............. | 439/235 |
| 4,918,582 A | * | 4/1990 | McIngvale et al. ............. | 362/217 |
| 5,012,396 A | * | 4/1991 | Costa ............. | 362/11 |
| 5,595,505 A | * | 1/1997 | Duke et al. ............. | 439/630 |
| 5,610,472 A | * | 3/1997 | Schmitt, Jr. ............. | 362/369 |
| 5,676,459 A | * | 10/1997 | Bedford et al. ............. | 362/390 |

(Continued)

OTHER PUBLICATIONS

International Application No. PCT/KR02/00613 Filed Apr. 8, 2002, "Cold Cathode Fluorescent Lamp, Container Having the Same, and Liquid Crystal Display Device Having the Container".

Primary Examiner—Sandra O'Shea
Assistant Examiner—Ismael Negron
(74) Attorney, Agent, or Firm—Cantor Colburn LLP

(57) ABSTRACT

A lamp assembly includes a lamp having two electrodes, a power supply module formed with a clip for gripping the electrodes, a base body on which at least two power supply modules are intermittently disposed in series, and an insulating partition for insulating the power supply modules from each other.

19 Claims, 11 Drawing Sheets

U.S. PATENT DOCUMENTS 5,907,218 A * 5/1999 Altman et al. .............. 439/235
6,203,172 B1 * 3/2001 Wanuch et al. ............. 362/225
6,527,414 B1 * 3/2003 Moon ......................... 362/225
6,555,974 B1 * 4/2003 Cline et al. ................. 315/312

* cited by examiner

POWER SUPPLY MODULE FOR LAMP TUBE ASSEMBLY

BACKGROUND OF THE INVENTION

1. Field of the Invention

The present invention relates to a lamp assembly and a liquid crystal display device having the same, and more particularly to a lamp assembly having multiple power supply modules insulated each other for providing a power to lamps and a liquid crystal display device having the same.

2. Description of the Related Art

Generally, a display device serves as an interface device for processing electric signals of image data to display visible images on a screen.

A liquid crystal display device has superior display quality and slimmer and lighter structure as compared with other display devices having the same screen size. The liquid crystal display device mainly includes a liquid crystal control part for controlling optical properties of liquid crystal and a light supply part for supplying light to liquid crystal.

The liquid crystal control part also has a display panel with a plate shape for displaying images. The liquid crystal control part may have a size of 60 inches or larger in its diagonal line.

The light supply part supplies light to the liquid crystal control part so that the liquid crystal control part displays images.

When the liquid crystal control part has a relatively small size, light emitting diodes (LED) each of which is a point light source, or one or two cold cathode fluorescent lamps (CCFL) having a short length are used as the light supply part.

As the size of the liquid crystal control part is increased, there is more demand in quantity of light to be supplied from the light supply part to the liquid crystal control part. That is, when the size of the liquid crystal control part increases, the point light source is not desirable and the number and length of the cold cathode fluorescent lamps should increase. The cold cathode fluorescent lamps are generally disposed under the liquid crystal control part. Since the cold cathode fluorescent lamp is a linear light source, brightness of light is reduced as the liquid crystal control part is apart from the cold cathode fluorescent lamps.

To avoid such a problem, the cold cathode fluorescent lamps are disposed in parallel with each other and have a regular interval between adjacent lamps.

However, in order to light the cold cathode fluorescent lamps disposed in parallel, electric wires have to be respectively connected to electrodes of the cold cathode fluorescent lamps, so that the structure thereof becomes complicated.

The problems in such a structure of a plurality of cold cathode fluorescent lamps in parallel are solved in "Cold cathode fluorescent lamp, container having the same, and liquid crystal display device having the container" which has been filed with PCT (PCT application No. PCT/KR02-00613) by the applicant of the present invention, whose disclosure in its entirety is incorporated by reference herein.

According to the above PCT application, a plurality of lamps are grouped into several groups and the grouped lamps are connected with a conductive power supply module by being gripped with a plurality of conductive clips disposed on the power supply module. In this state, power is supplied to the power supply module so that the power is transferred to the lamps through the clips.

However, it may be necessary to dispose at least two power supply modules in series when the number of lamps increases. In this case, an electric interference may be generated between the power supply modules.

That is, if an interval between the adjacent power supply modules is narrow, electric discharge is generated between conductors of the power supply modules so that the electric interference is generated there between. As a result, an insulation state between the power supply modules may not be maintained.

On the contrary, if the interval between the power supply modules is increased to maintain an insulation state between the power supply modules, the size of a liquid crystal display device employing such lamp assembly increases.

BRIEF SUMMARY OF THE INVENTION

The present invention provides a lamp assembly for providing light and preventing power supply modules from being malfunctioned when providing a power to a plurality of lamps generating the light.

The present invention provides a liquid crystal display device having a lamp assembly for providing light and preventing power supply modules from being malfunctioned when providing a power to a plurality of lamps generating the light.

In one aspect of the invention, a lamp assembly comprises a lamp including a lamp tube and first and second electrodes disposed on the lamp tube; a power supply module including a first power supply module coupled to the first electrode to supply a first voltage to the first electrode and a second power supply module coupled to the second electrode to supply a second voltage to the second electrode; a base body for receiving the first and second power supply modules; and a first insulating partition disposed between the first power supply module and another first power supply module, and a second insulating partition disposed between the second power supply module and another second power supply module, the first and second insulating partitions being disposed on the base body.

In another aspect, a liquid crystal display device comprises a lamp assembly including a lamp including a lamp tube and first and second electrodes disposed on the lamp tube, a power supply module including a first power supply module coupled to the first electrode to supply a first voltage to the first electrode and a second power supply module coupled to the second electrode to supply a second voltage to the second electrode, a base body for receiving the first and second power supply modules, and a first insulating partition disposed between the first power supply module and another first power supply module, and a second insulating partition disposed between the second power supply module and another second power supply module, the first and second insulating partitions being disposed on the base body; a receiving container for receiving the lamp assembly; a liquid crystal display panel assembly disposed in the receiving container to receive light emitted from the lamp assembly; and a chassis fixed to the receiving container in order to press an edge of the liquid crystal display panel assembly such that the liquid crystal display panel assembly is prevented from being separated from the receiving container.

According to the present invention, a plurality of lamps grouped into several groups are simultaneously lit by means of power supply modules while an insulation state is maintained between the power supply modules, thereby preventing the lamps and the liquid crystal display device from being broken and improving the performance of the lamps. In addition, the size of the liquid crystal display device may not be unnecessarily increased.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
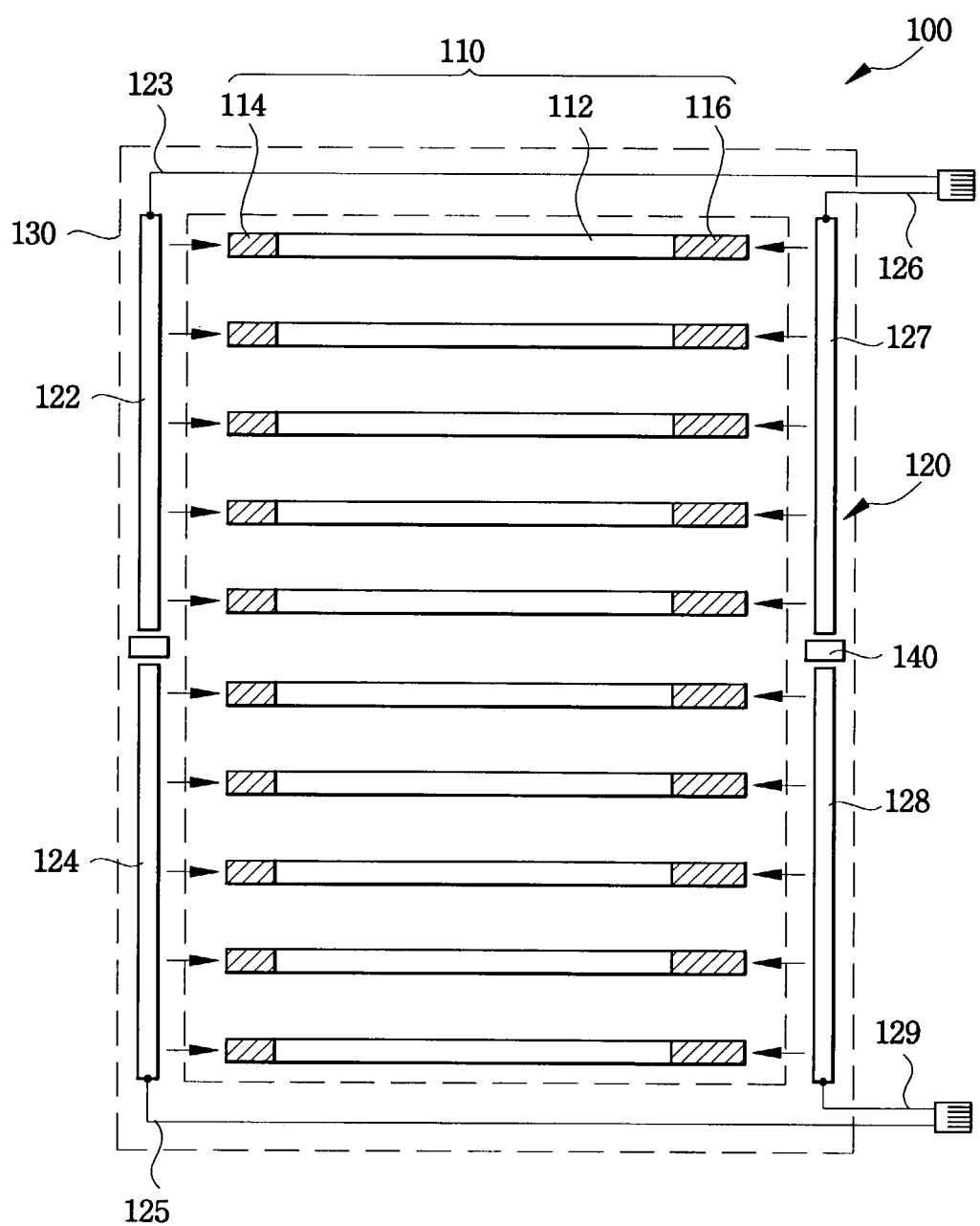
FIG. 1 is a schematic view showing a lamp assembly according to an embodiment of the present invention.

FIG. 1 is a schematic view showing a lamp assembly 100 according to an embodiment of the present invention.

Referring to FIG. 1, the lamp assembly 100 includes lamps 110, a power supply module 120, a base body 130 and an insulating partition 140.

Each lamp has a lamp tube 112, a first electrode 114 and a second electrode 116. Preferably, at least two lamps 110 are provided.

The lamp tube 112 is a transparent tube having predetermined thickness and length. Fluorescent material is coated on an inner wall of the lamp tube 112 to convert invisible light to visible light. In addition, a discharging gas is injected into the lamp tube 112 so as to generate the invisible light. Discharging gas generates the invisible light when it is dissociated due to a high difference of electric fields.

The first and second electrodes 114 and 116 provide the electric field difference sufficient for dissociating the discharging gas to the lamp tube 112. The first and second electrodes 114 and 116 are coupled to a surface of the lamp tube 112. The first and second electrodes 114 and 116 are disposed on the surface of the lamp tube 112 such that an insulation state between the first and second electrodes 114 and 116 is maintained. The first electrode 114 is disposed at a first end of the lamp tube 112 and the second electrode 116 is disposed at a second end of the lamp tube 112, which is opposite to the first end.

The first and second electrodes 114 and 116 have a sleeve shape, such that they can be inserted into the lamp tube 112. On the other hand, the first and second electrodes 114 and 116 may be plated on the surface of the lamp tube 112. The first and second electrodes 114 and 116 may be formed on the surface of the lamp tube 112, for example, through an electroless plating process.

According to the electroless plating process, metal ions contained in aqueous solution receive electrons due to a reducing agent so that metal ions are reduced into metal molecules, thereby forming a metal thin film on the surface of the lamp tube 112. The electroless plating process may be applicable for non-metallic materials such as glass.

A plurality of lamps 110 having the above-structure are disposed in parallel so as to generate light.

A same interval is maintained between adjacent lamps 110 in order to uniformly distribute brightness of light. The lamps 110 generate light when power is applied to the first and second electrodes 114 and 116.

The power supply module 120 supplies the power to the first and second electrodes 114 and 116 of the lamps 110 while fixedly gripping the first and second electrodes 114 and 116 of the lamps 110.

The power supply module 120 includes at least two first power supply modules 122 and 124 and at least two second power supply modules 127 and 128.

The first power supply modules 122 and 124 apply a first voltage to the first electrodes 114 and the second power supply modules 127 and 128 apply a second voltage to the second electrodes 116.

Reference numerals 123 and 125 represent first power supply lines for supplying the first voltage to the first power supply modules 122 and 124 and reference numerals 126 and 129 represent second power supply lines for supplying the second voltage to the second power supply modules 127 and 128.

The first and second voltages have an electric field difference sufficient for dissociating discharging gas injected into the lamp tube 112.

Figure 2:
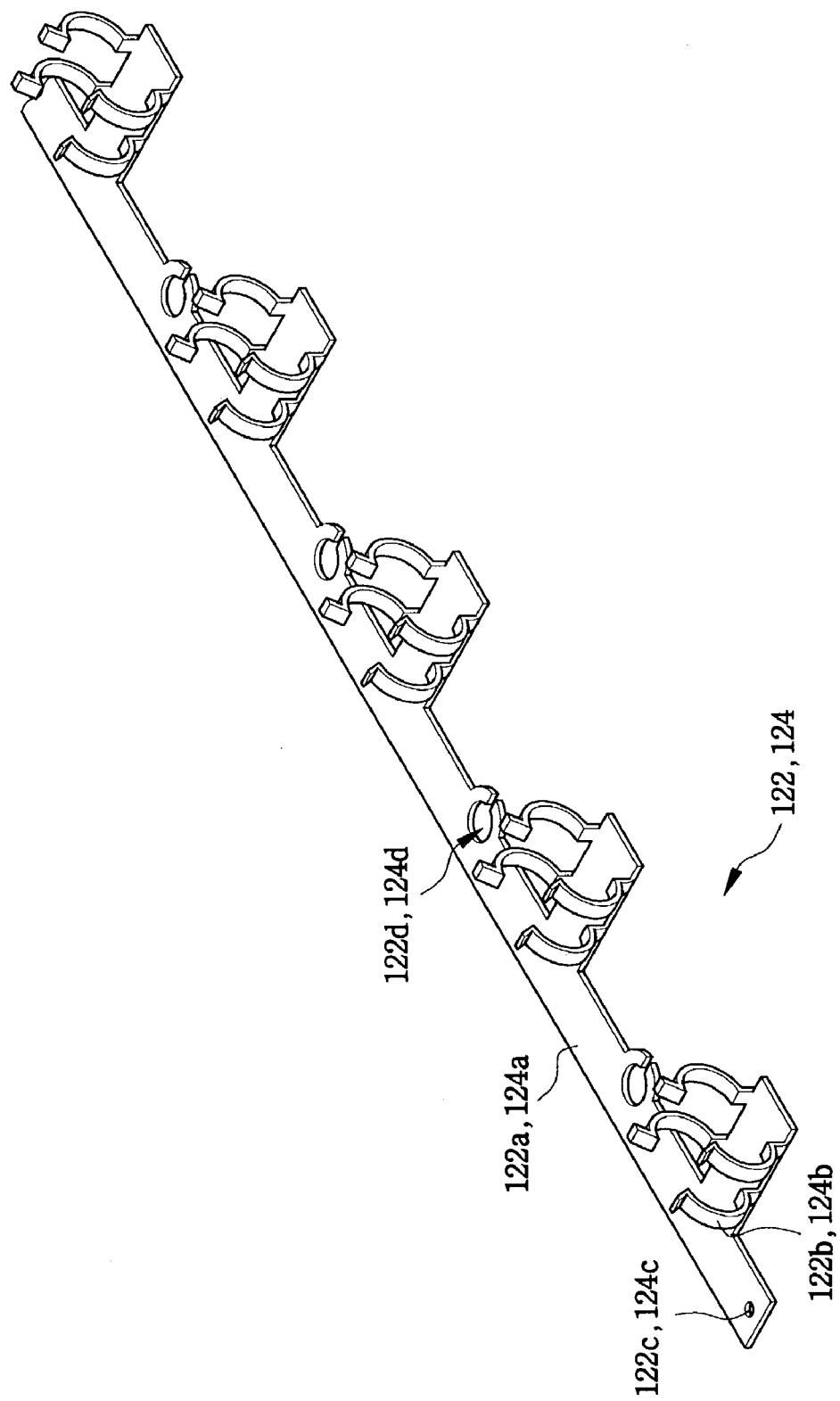
FIG. 2 is a perspective view showing a part of a first power supply module according to an embodiment of the present invention.

FIG. 2 is a perspective view showing a part of the first power supply modules according to an embodiment of the present invention.

Referring to FIGS. 1 and 2, the first power supply modules 122 and 124 include first power supply bodies 122a and 14a and first clips 12b and 14b, respectively.

The first voltage is applied to the first power supply bodies 122a and 14a through the first power supply lines 123 and 125. In addition, coupling holes 122c and 124c are formed in the first power supply bodies 122a and 14a in order to electrically connect the first power supply bodies 122a and 14a to the first power supply lines 123 and 125.

At least one first clip 122b and 124b is formed in each of the first power supply bodies 122a and 124a. For example, a first clip 122b and 124b has a pair of clips as shown in FIG. 2. The first clips 122b and 124b each have first height $HE_1$ and first length $LE_1$.

The first clips 12b and 14b are bent to securely grip the first electrode 114.

Reference numerals 122d and 124d represent screw holes for fixing the first power supply bodies 122a and 14a to the base body 130.

Figure 3:
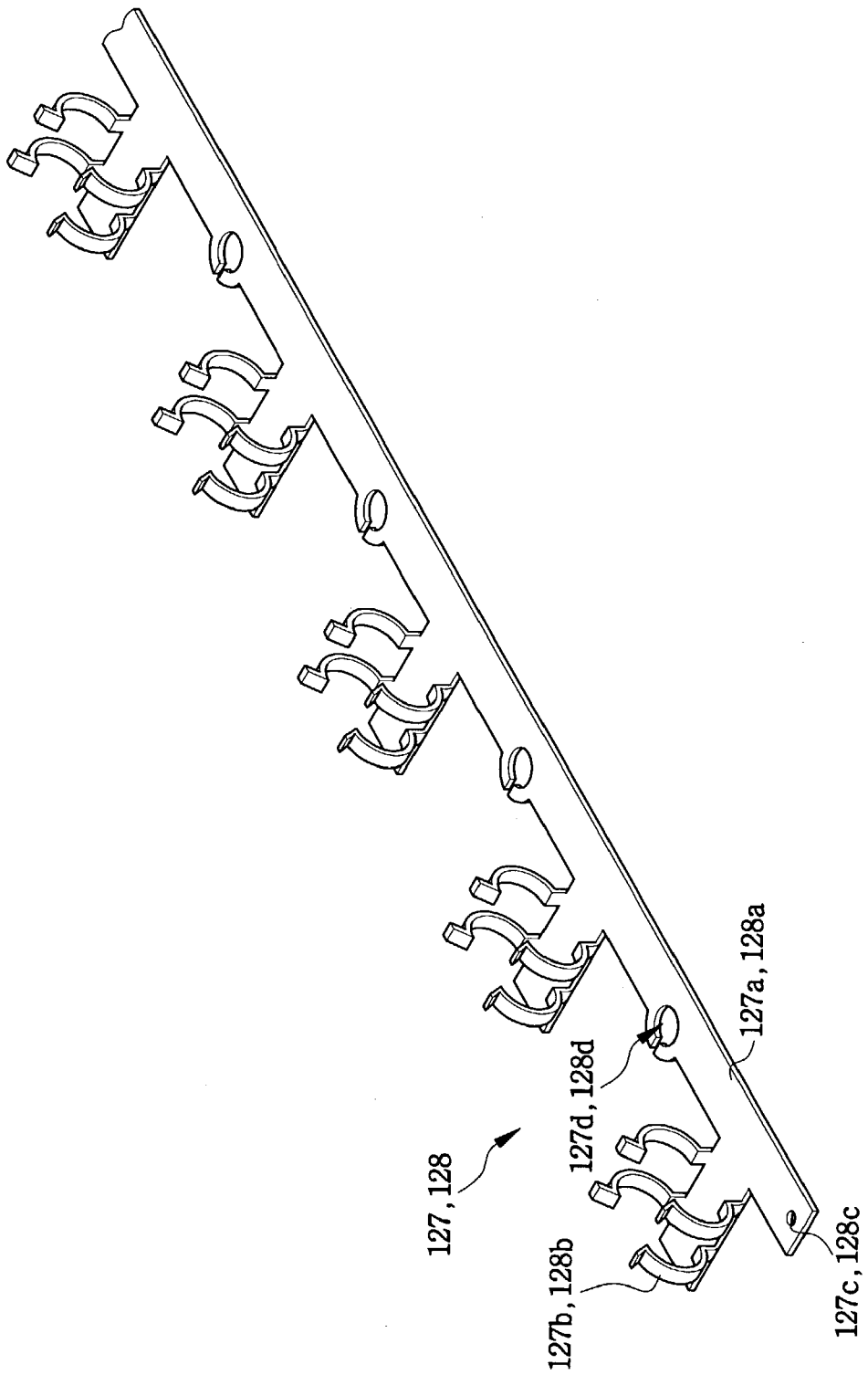
FIG. 3 is a perspective view showing a part of a second power supply module according to an embodiment of the present invention.

FIG. 3 is a perspective view showing a part of the second power supply modules according an embodiment of the present invention.

Referring to FIGS. 1 to 3, the second power supply modules 127 and 128 include second power supply bodies 127a and 128a and second clips 127b and 128b, respectively.

The second voltage is applied to the second power supply bodies 127a and 128b through the second power supply lines 126 and 129. In addition, coupling holes 127c and 128c are formed in the second power supply bodies 127a and 128a in order to electrically connect the second power supply bodies 127a and 128a to the second power supply lines 126 and 129.

At least one second clip 127b and 128b is formed in each of the second power supply bodies 127a and 128a. For example, a second clip 127b and 128b has a pair of clips as shown in FIG. 3. The second clips 127b and 128b each have second height $HE_2$ and second length $LE_2$.

First height $HE_1$ and first length $LE_1$ of the first clips 122b and 124b are substantially identical to second height $HE_2$ and second length $LE_2$ of the second clips 127b and 128b, respectively.

The second clips 127b and 128b are bent to securely grip the second electrode 116.

Reference numerals 127d and 128d represent screw holes for fixing the second power supply bodies 127a and 128a to the base body 130.

The power supply module 120 applies power to the lamps 110 from an exterior, thereby lighting the lamps 110.

In detail, the lamps 110 are simultaneously lit by means of at least two adjacent first power supply modules 122 and 124 and at least two adjacent second power supply modules 127 and 128. For example, ten lamps 110 are simultaneously lit by means of at least two adjacent first power supply modules 122 and 124 and at least two adjacent second power supply modules 127 and 128. The power supply module 120 is coupled to the base body 130.

Figure 4:
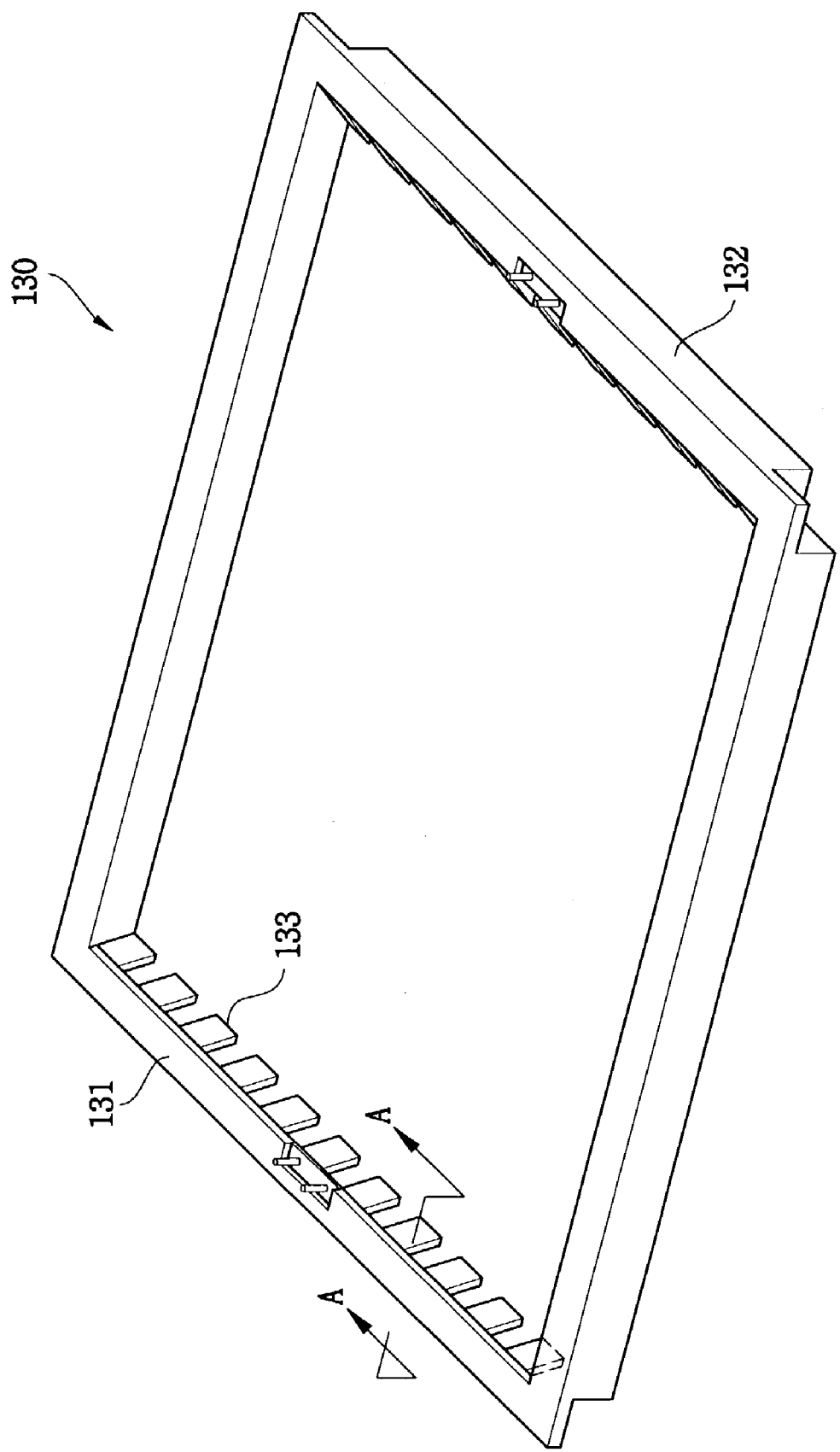
FIG. 4 is a perspective view showing a base body according to an embodiment of the present invention.
Figure 5:
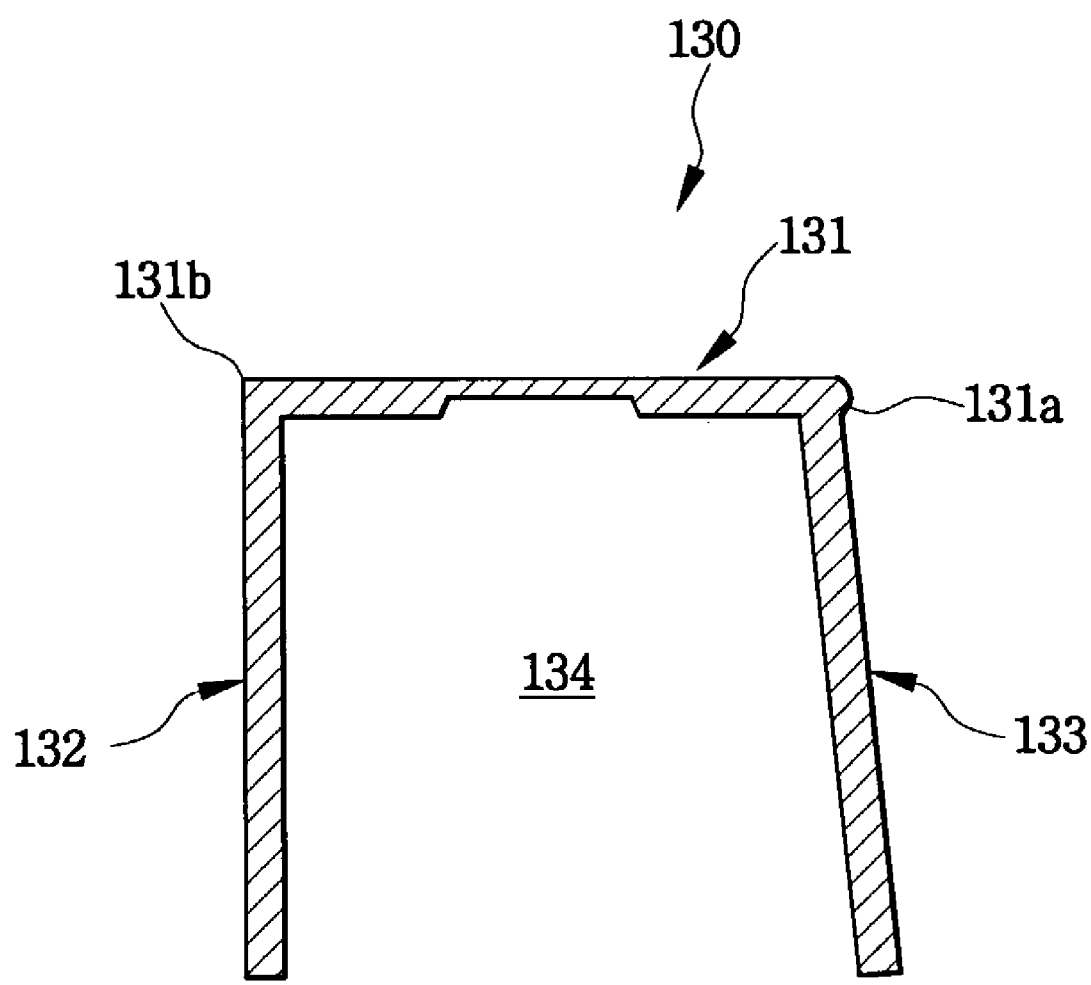
FIG. 5 is a sectional view of the base body taken along the line A—A shown in FIG. 4.

FIG. 4 is a perspective view showing the base body according to the embodiment of the present invention and FIG. 5 is a sectional view of the base body taken along line A—A shown in FIG. 4.

Referring to FIGS. 4 and 5, the base body 130 protecting the fragile lamps 110 includes a hollow frame of a rectangular shape. The base body 130 does not block the light emitted from the lamp tube 112 of the lamp 110 shown in FIG. 1, while covering the first and second electrodes 114 and 116, which do not emit light.

As shown in FIGS. 4 and 5, the base body 130 has a first side 131, a second side 132 and a third side 133.

Referring to FIG. 5, the first side 131 has a rectangular strip shape and also may have a rectangular opening. The first side 131 includes an inner rim 131a and an outer rim 131b. The second side 132 is extended from the outer rim 131b of the first side 131 by a first length. The third side 133 faces the second side 132 and is extended from the inner rim 131 a of the first side 131 by the first length.

Thus, a receiving space 134 is defined by the first to third sides 131, 132 and 133. The first and second electrodes 114 and 116 of the lamp 110 are disposed in the receiving space 134.

Figure 6:
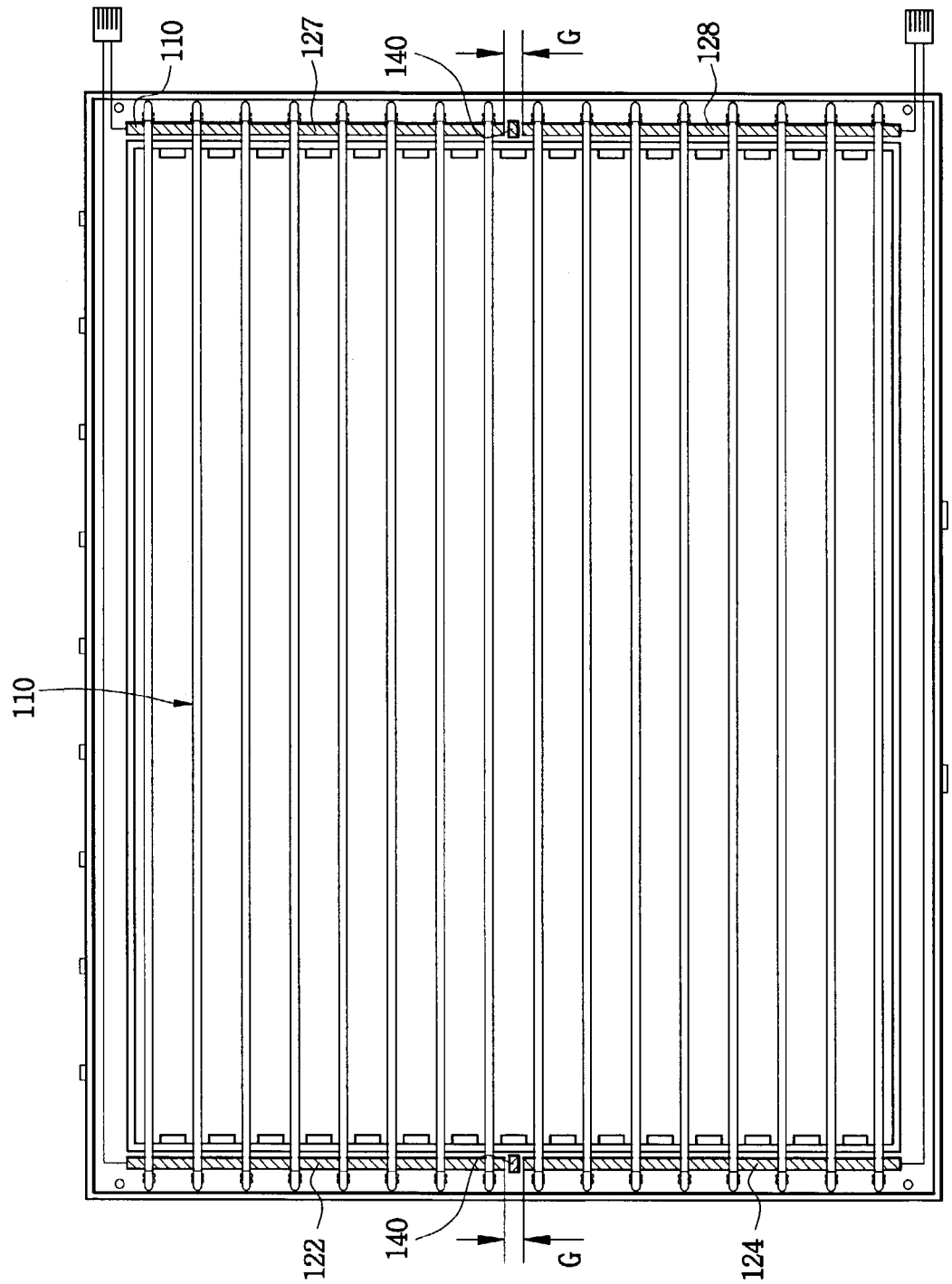
FIG. 6 is a bottom view showing first and second power supply modules and lamps mounted on a base body according to an embodiment of the present invention.

FIG. 6 is a bottom view of the lamp assembly 100, showing the first and second power supply modules and lamps mounted on the base body according to the embodiment of the present invention.

Referring to FIG. 6, the first power supply modules 122 and 124 are coupled to a rear portion of the first side 131 of the base body 130, and the second power supply modules 127 and 128 are also disposed at a rear portion of the corresponding first side of the base body 130. The first power supply modules 122 and 124 have a gap G, and the second power supply module 127 and 128 also have a gap G therebetween. The first and second power supply modules are disposed in parallel to each other.

The areal size of the base body 130 may increase by enlarging the gap G to maintain a more secured insulation state between the first power supply modules 122 and 124. Thus, the size of a liquid crystal display device employing such lamp assembly also increases.

On the contrary, the areal size of the base body 130 may decreases by minifying the gap G. In this case, the insulation state between the first power supply modules 122 and 124 may not be maintained.

In addition, the second power supply modules 127 and 128 are disposed in line with each other. The areal size of the base body 130 may increase by enlarging the gap G to maintain a more secured insulation state between the second power supply modules 127 and 128. Thus, the size of a liquid crystal display device employing such lamp assembly also increases.

On the contrary, the area size of the base body 130 may decrease by minifying the gap G. In this case, the insulation state between the second power supply modules 127 and 128 may not be maintained.

In order to reduce the size of the base body 130 while the insulation state between the first power supply modules 122 and 124 and between the second power supply modules 127 and 128 is maintained, an insulating partition is disposed in the base body 130.

Figure 7:
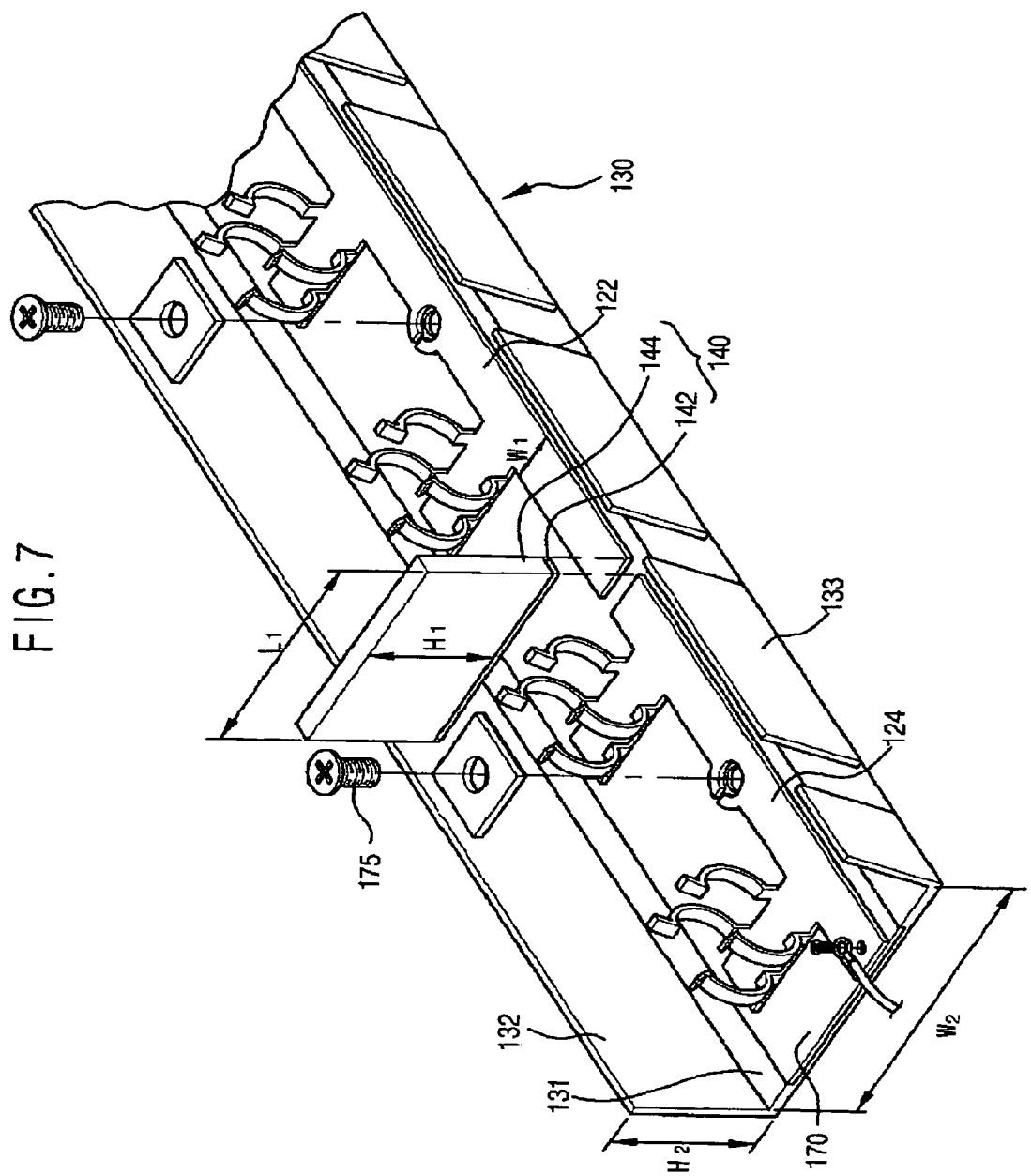
FIG. 7 is an exploded perspective view of an insulating partition disposed between first power supply modules according to an embodiment of the present invention.

FIG. 7 is an exploded perspective view of the insulating partition disposed between the first power supply modules according to an embodiment of the present invention.

Referring to FIG. 7, the insulating partition 140 includes an insulating body 144 and an adhesive 142. The insulating body 144 is arranged in a space between the first power supply modules 122 and 124, and the adhesive 142 attaches the insulating body 144 to the first side 131 of the base body 130. The first power supply modules 122 and 124 are insulated from each other by means of the insulating partition 140.

The length $L_1$ of the insulating body 144 is substantially same as or longer than a first width $W_1$ of the first power supply modules 122 and 124, or substantially same as or shorter than a second width $W_2$ defined between the second and third sides 132 and 133 of the base body 130.

In addition, the height $H_1$ of the insulating body 144 is substantially same as or higher than the thickness of the first power supply modules 122 and 124, or substantially same as or lower than the height $H_2$ of the second and third sides 132 and 133 of the base body 130.

In addition, the insulating partition 140 having the insulating body 144 and the adhesive 142 is also disposed between the second power supply modules 127 and 128. The insulation partition 140 is disposed between the second power supply modules 127 and 128 with the same manner as described above, so it will not be further described below.

Figure 8:
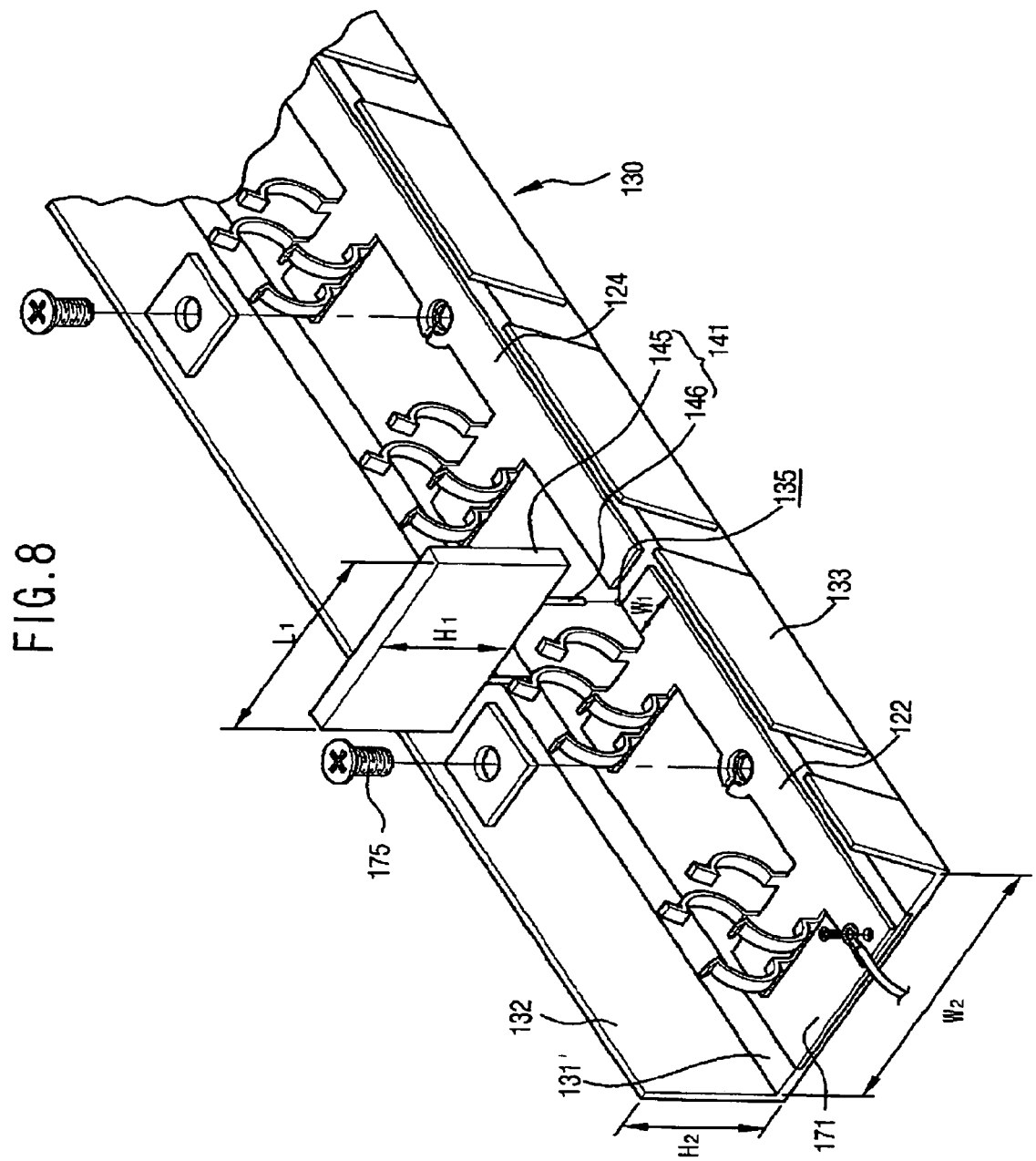
FIG. 8 is an exploded perspective view of an insulating partition disposed between first power supply modules according to another embodiment of the present invention.

FIG. 8 is an exploded perspective view of an insulating partition disposed between the first power supply modules according to another embodiment of the present invention.

Referring to FIG. 8, the insulating partition 141 includes an insulating body 145 and a fixing pin 146 disposed at the bottom of the insulating body 145. An fixing hole 135 such as a slot or a perforation hole is formed between the first power supply modules 122 and 124. The shape and position of the fixing pin 146 are determined to fit into the fixing hole 135. The insulating body 145 is fixed to a first side 131' of a base body 130' by means of the fixing pin 146.

The length $L_1$ of the insulating body 145 is substantially equal to or longer than a first width $W_1$ of the first power supply modules 122 and 124, or substantially equal to or shorter than a second width $W_2$ defined between the second and third sides 132 and 133 of the base body 130'.

In addition, the height $H_1$ of the insulating body 145 is substantially equal to or higher than the thickness of the first power supply modules 122 and 124, or substantially equal to or lower than the height $H_2$ of the second and third sides 132 and 133 of the base body 130'.

In addition, the insulating partition 141 having the insulating body 145 and the fixing pin 146 is also disposed between the second power supply modules 127 and 128. The insulation partition 141 is disposed between the second power supply modules 127 and 128 with the same manner as described above, so it will not be further described below.

Figure 9:
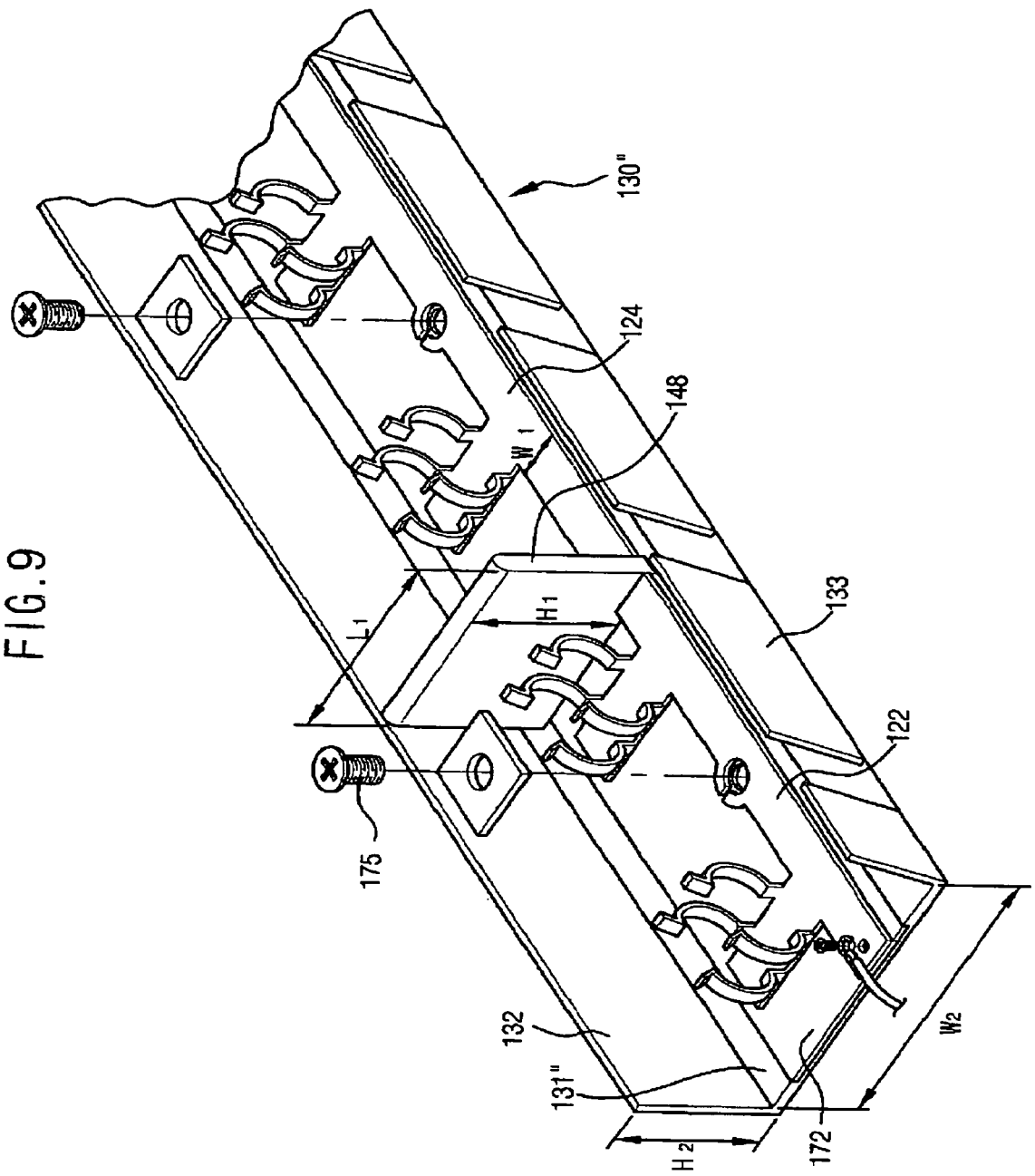
FIG. 9 is an exploded perspective view of an insulating partition disposed between first power supply modules according to still another embodiment of the present invention.

FIG. 9 is an exploded perspective view of an insulating partition 148 disposed between the first power supply modules according to still another embodiment of the present invention.

Referring to FIG. 9, the insulating partition 148 is protruded from a base body 130" and formed between the first power supply modules 122 and 124 so as to insulate the first power supply modules 122 and 124 from each other. The insulating partition 148 is integrally formed on a first side 131" of the base body 130" by means of a molding process.

The length $L_1$ of the insulating partition 148 is substantially equal to or longer than a first width $W_1$ of the first power supply modules 122 and 124, or substantially equal to or shorter than a second width $W_2$ defined between the second and third sides 132 and 133 of the base body 130".

In addition, the height $H_1$ of the insulating partition 148 is substantially equal to or higher than the thickness of the first power supply modules 122 and 124, or substantially equal to or lower than the height $H_2$ of the second and third sides 132 and 133 of the base body 130".

The insulating partition 148 is also disposed between the second power supply modules 127 and 128. The insulation partition 140 is disposed between the second power supply modules 127 and 128 with the same manner as described above, so it will not be further described below.

Since the lamps 110 of the lamp assembly 100 are brittle, they are vulnerable to an external impact. In order to solve this problem, as shown in FIG. 7, a rubber plate 170 is disposed between the first side 131 of the base body 130 and the first power supply modules 122 and 124 and between the first side 131 of the base body 130 and the second power supply modules 127 and 128. In addition, as shown in FIG. 8, a rubber plate 171 may be disposed between the first side 131' of the base body 130' and the first power supply modules 122 and 124 and between the first side 131' of the base body 130' and the second power supply modules 127 and 128. Furthermore, as shown in FIG. 9, a rubber plate 172 may be disposed between the first side 131" of the base body 130" and the first power supply modules 122 and 124 and between the first side 131" of the base body 130" and the second power supply modules 127 and 128. The rubber plates 170, 171 and 172 serve as an impact absorber to cope with an external impact.

The liquid crystal display device 900 mainly includes a lamp assembly 100, a liquid crystal display panel assembly 600, a receiving container 450 and a top chassis 800. In addition, the liquid crystal display device 900 further includes a middle chassis 200 and optical sheets 700.

The liquid crystal display panel assembly 600 includes a liquid crystal display panel 610 and a driving device 620.

Figure 10:
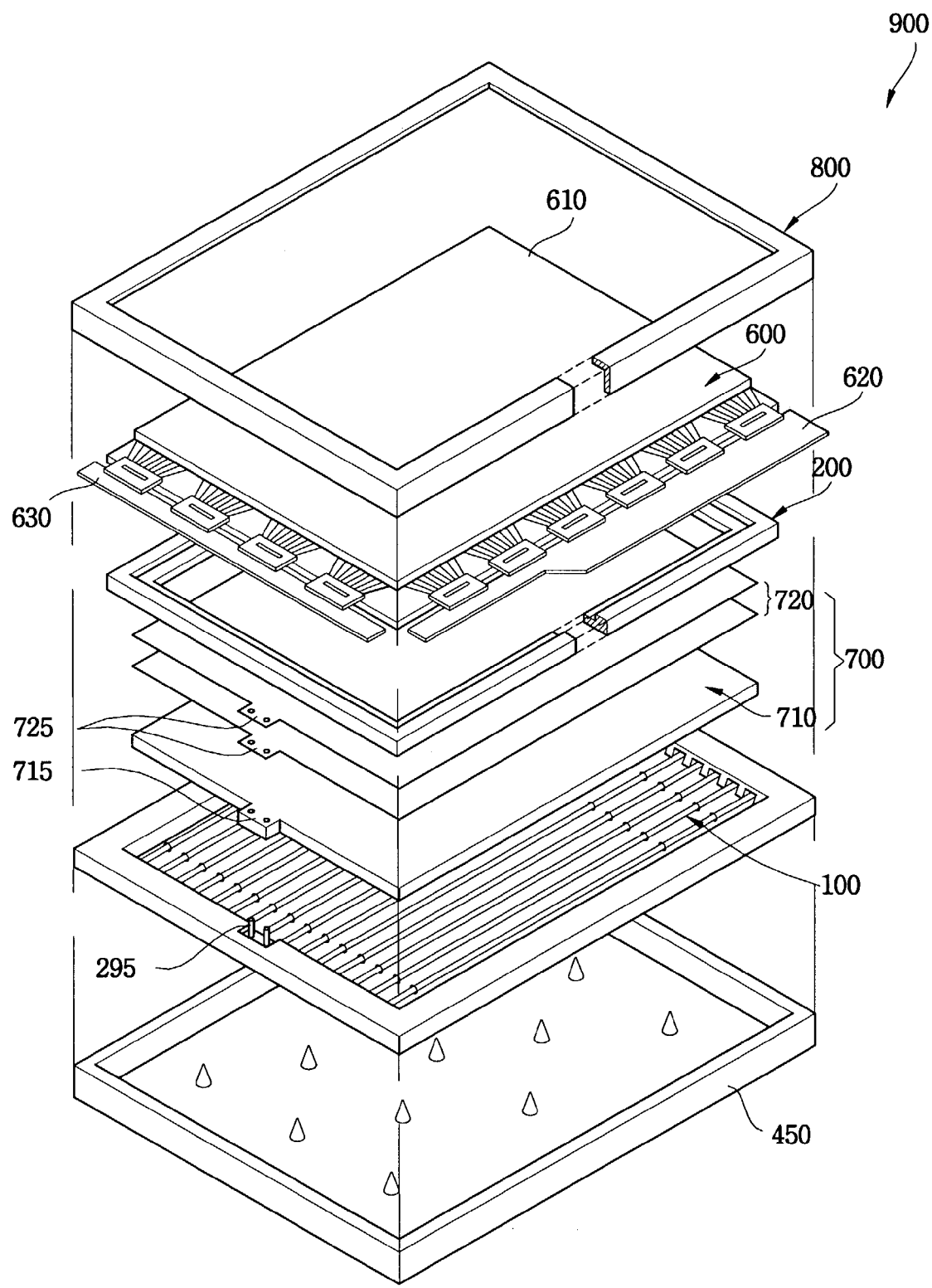
FIG. 10 is an exploded perspective view of a liquid crystal display device according to an embodiment of the present invention.
Figure 11:
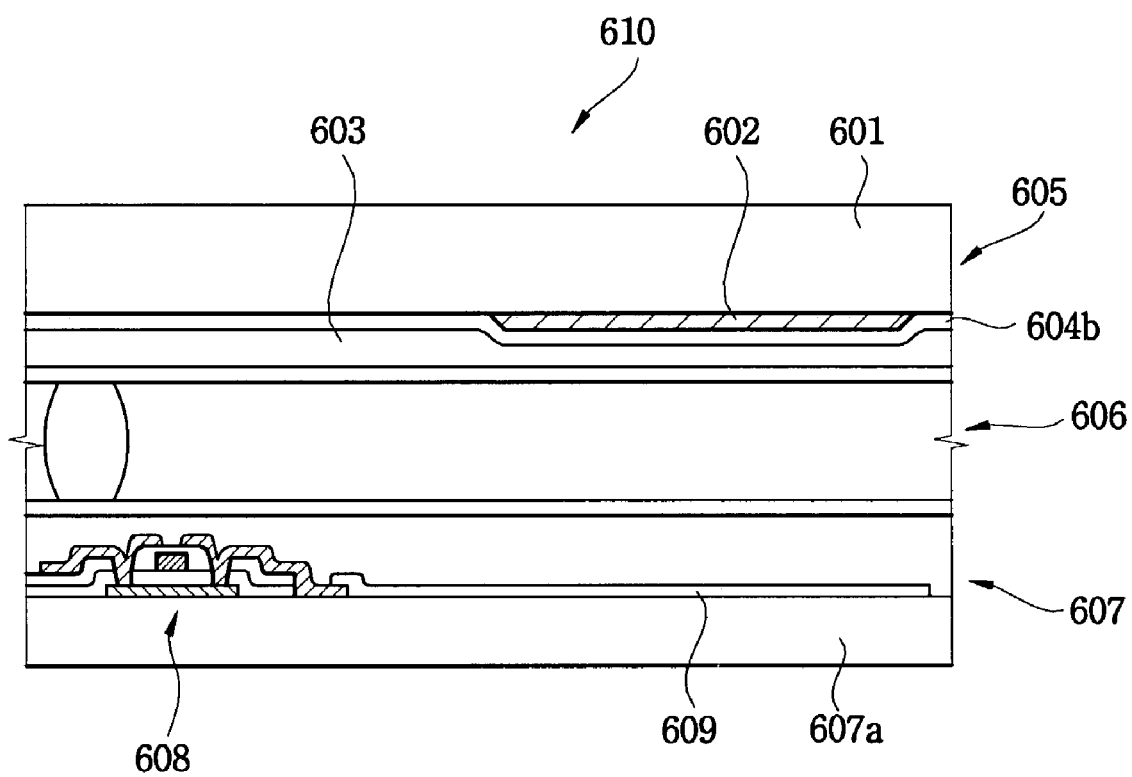
FIG. 11 is a sectional view of the liquid crystal display panel in FIG. 10.

FIG. 11 is a sectional view of the liquid crystal display panel 610 in FIG. 10.

Referring to FIG. 11, the liquid crystal display panel 610 includes a color filter substrate 605, a TFT substrate 607 and liquid crystal 606.

The TFT substrate 607 includes a transparent substrate 607a, a thin film transistor 608 and a pixel electrode 609.

The thin film transistor 608 is formed on the transparent substrate 607a in a matrix configuration through a thin film forming process. The pixel electrode 609 is connected to an output terminal of each thin film transistor 608. The pixel electrode 609 may be made of transparent and conductive material such as indium tin oxide or indium zinc oxide material.

The color filter substrate 605 includes a transparent substrate 601, a color filter 602 and a common electrode 603.

The color filter 602 is disposed on the transparent substrate 601 at an area corresponding to the pixel electrode 609. The common electrode 603 is disposed over a whole area of the transparent substrate 601 so as to cover the pixel electrode 609.

Liquid crystal 606 is filled into a cell gap between the TFT substrate 607 and the color filter substrate 602 in a down-drop manner or a vacuum injection manner. Liquid crystal 606 changes a light transmittance based on an electric field difference between the pixel electrode 609 and the common electrode 603.

The liquid crystal display panel assembly 600 may control optical properties of the liquid crystal 606 filled in the liquid crystal display panel 610. However, the liquid crystal display panel assembly 600 cannot display images without light externally provided.

In other words, the liquid crystal display panel assembly 600 controls quantity of light passing through the liquid crystal 606. Thus, light is provided to the liquid crystal display panel 610 for the liquid crystal display device 900 to display images.

Also, light having non-uniform brightness is not desirable for displaying images because light having non-uniform brightness divides an image displayed on a screen or creates an uneven image, where an image is darker in one part and brighter in another part. Accordingly, light having uniform brightness is desirable for the liquid crystal display device 900 to display quality images.

To this end, the lamp assembly 100 of the liquid crystal display device 900 is designed to provide light with uniform brightness. The lamp assembly 100 is described above with reference to the embodiments shown in FIGS. 1 to 9.

Referring to FIG. 10 again, the optical sheets 700 include a diffusion sheet 710 and a prism sheet 720. The diffusion sheet 710 reduces brightness deviation of light generated from the lamps 110 of the lamp assembly 100. The prism sheet 720 corrects an orientation of light passed through the diffusion sheet 710, so that more amount of light is incident into the liquid crystal display panel 600, thereby improving usage efficiency of light.

The middle chassis 200 to be received in the receiving container 450 receives the liquid crystal display panel assembly 600 therein.

The receiving container 450 has sidewalls, a bottomsurface, and an open upper surface. The lamp assembly 100, the optical sheets 700 and the middle chassis 200 are received in the receiving container 450.

The top chassis 800, which may be made of stainless steel, is coupled with the receiving container 450 on its sidewall and surrounds an edge portion of the liquid crystal display panel assembly 600.

The top chassis 800 prevents the liquid crystal display panel assembly 600 from being separated from the receiving container 450 and protects the liquid crystal display panel assembly 600 from an external impact.

According to the present invention, a plurality of lamps are disposed in parallel with each other and grouped into several groups each of which a voltage is supplied to from a power supply module. An insulating state is maintained between adjacent power supply modules each of which provides a voltage to a corresponding group of lamps.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A lamp assembly comprising:
   a plurality of lamps, each of the lamps including a lamp tube, a first electrode and a second electrode;
   a plurality of first power supply modules, each first power supply module including a plurality of first power supply contacts that are electrically connected to each other and each coupled to a corresponding first electrode to supply a first voltage to each first electrode;
   a first insulating partition disposed between the first power supply modules;
   a plurality of second power supply modules, each second power supply module including a plurality of second power supply contacts that are electrically connected to each other and each coupled to a corresponding second electrode to supply a second voltage to each second electrode;
   a second insulating partition disposed between the second power supply modules; and
   a base body for receiving the lamps, the first and second power supply modules and the first and second insulating partitions,
   wherein the first and second power supply modules are disposed at opposite sides, respectively, of the lamps; and
   wherein the base body includes sidewalls to form a receiving space in which the first and second power supply modules are disposed.

2. The lamp assembly as claimed in claim 1, wherein the receiving space receives the first and second electrodes of the lamp which are secured on the base body.

3. The lamp assembly as claimed in claim 1, wherein the first and second power supply modules are fixed to the base body by means of a coupling screw.

4. The lamp assembly as claimed in claim 1, wherein each of the first and second electrodes is plated on a surface of the lamp tube.

5. The lamp assexnbly as claimed in claim 1, wherein each of the first and second electrodes has a sleeve shape.

6. The lamp assembly as claimed in claim 1, wherein the first voltage is simultaneously applied to the first power supply contacts of each first power supply module.

7. The lamp assembly as claimed in claim 1, wherein the second voltage is simultaneously applied to the second power supply contacts of each second power supply module.

8. The lamp assembly as claimed in claim 1, wherein the first insulating partition includes a first insulating body disposed between the first power supply modules and a first adhesive for fixing the first insulating body onto the base body, and the second insulating partition includes a second insulating body disposed between the second power supply modules and a second adhesive for fixing the second insulating body onto the base body.

9. The lamp assembly as claimed in claim 8, wherein the first and second insulating bodies each have a length longer than a width of the first and second power supply modules, respectively, and shorter than a width of the base body, and a height substantially equal to or lower than a height of the base body and substantially equal to or higher than a thickness of the first and second power supply modules, respectively.

10. The lamp assembly as claimed in claim 1, wherein the first insulating partition includes a first protrusion inserted into a first fixing hole formed in the base body between the first power supply modules, and the second insulating partition includes a second protrusion inserted into a second fixing hole formed in the base body between the second power supply modules.

11. The lamp assembly as claimed in claim 10, wherein the first and second insulating partitions each have a length longer than a width of the first and second power supply modules, respectively, and shorter than a width of the base body, and a height substantially equal to or lower than a height of the base body and substantially equal to or higher than a thickness of the first and second power supply modules, respectively.

12. The lamp assembly as claimed in claim 1, wherein the first and second insulating partitions are each formed on the base body to be integrally protruded from the base body.

13. The lamp assembly as claimed in claim 12, wherein the first and second insulating partitions each have a length longer than a width of the first and second power supply modules, respectively, and shorter than a width of the base body, and a height substantially equal to or lower than a height of the base body and substantially equal to or higher than a thickness of the first and second power supply modules, respectively.

14. The lamp assembly as claimed in claim 1, wherein each of the first power supply modules comprises a first power supply body and a plurality of first clips disposed on the first power supply body to grip the first electrode of each of the lamps, and each of the second power supply modules comprises a second power supply body and a plurality of second clips disposed on the second power supply body to grip the second electrode of each of the lamps.

15. The lamp assembly as claimed in claim 14, wherein the first and second clips each have a pair of clips bent to securely grip the first and second electrodes, respectively.

16. The lamp assembly as claimed in claim 1, further comprising a first impact absorbing member disposed between the first power supply modules and the base body and a second impact absorbing member disposed between the second power supply modules and the base body.

17. The lamp assembly as claimed in claim 16, wherein the first and second impact absorbing members are each a rubber plate to absorb an impact externally applied.

18. The lamp assembly as claimed in claim 1, wherein each of the first power suppiy modules is electrically connected to a first power supply line, and each of the second power supply modules is electrically connected to a second power supply line.

19. The lamp assembly as claimed in claim 18, wherein the first voltage is applied to the first electrodes through each of the first power supply modules and the first power suppiy line, and the second voltage is applied to the second electrodes through each of the second power supply modules and the second power supply line.

* * * * *